United States Patent
Ray

(10) Patent No.: US 10,210,079 B2
(45) Date of Patent: Feb. 19, 2019

(54) TOUCH FREE DISASTER RECOVERY

(71) Applicant: Sungard Availability Services, LP, Wayne, PA (US)

(72) Inventor: Kaushik Ray, Herndon, VA (US)

(73) Assignee: Sungard Availability Services, LP, Wayne, PA (US)

(*) Notice: Subject to any disclaimer, the term of this patent is extended or adjusted under 35 U.S.C. 154(b) by 136 days.

(21) Appl. No.: 15/292,646

(22) Filed: Oct. 13, 2016

(65) Prior Publication Data

US 2017/0083433 A1 Mar. 23, 2017

Related U.S. Application Data

(63) Continuation-in-part of application No. 14/682,262, filed on Apr. 9, 2015, now Pat. No. 9,836,365.
(Continued)

(51) Int. Cl.
 *G06F 11/00* (2006.01)
 *G06F 11/36* (2006.01)
 *G06F 11/20* (2006.01)

(52) U.S. Cl.
 CPC ........ *G06F 11/3692* (2013.01); *G06F 11/203* (2013.01); *G06F 11/2025* (2013.01);
 (Continued)

(58) Field of Classification Search
 CPC ............... G06F 11/2041; G06F 11/203; G06F 11/2025; G06F 11/3688; G06F 11/3684; G06F 11/3664
 (Continued)

(56) References Cited

U.S. PATENT DOCUMENTS 6,636,988 B1   10/2003   Firley et al.
6,732,294 B2   5/2004    Mackrory et al.
(Continued)

FOREIGN PATENT DOCUMENTS

EP   2645253   10/2013

OTHER PUBLICATIONS

International Search Report and Written Opinion dated Jun. 8, 2016 for International Application No. PCT/US2016/019687 filed on Feb. 26, 2016 by Sungard Availability Services, LP, 15 pages.
(Continued)

*Primary Examiner* — Yair Leibovich
(74) *Attorney, Agent, or Firm* — VLP Law Group, LLP

(57) ABSTRACT

A Recovery as a Service (RaaS) system including a Configuration Management Database (CMDB), a Resource Planning System (RPS), a Recovery Execution System (RES), and an Asset Reservation System (ARS). A scope for a test or recovery is specified as one or more applications. In one implementation, the RPS can request, from the CMDB, identification of which protected resources are within the requested scope and request the ARS to only reserve assets within that scope. At time of test or disaster, the RES programmatically generates a recovery workflow and initiates its orchestration such as provisioning and/or configuring operating systems, file systems, networks, applications, and data, and executing startup processes. If there are exceptions to automated workflow, then operations personnel may perform corresponding manual operations such as through a ticketing system.

15 Claims, 14 Drawing Sheets

Related U.S. Application Data

(60) Provisional application No. 62/241,189, filed on Oct. 14, 2015.

(52) U.S. Cl.
CPC ...... *G06F 11/2041* (2013.01); *G06F 11/3664* (2013.01); *G06F 11/3684* (2013.01); *G06F 11/3688* (2013.01)

(58) Field of Classification Search
USPC .......................................................... 714/37
See application file for complete search history.

(56) References Cited

U.S. PATENT DOCUMENTS

| | | | |
|---|---|---|---|
| 7,383,463 | B2 | 6/2008 | Hayden et al. |
| 7,992,031 | B2 | 8/2011 | Chavda et al. |
| 8,265,980 | B2 | 9/2012 | Ochs et al. |
| 8,402,064 | B2 | 3/2013 | Addala et al. |
| 8,438,418 | B2 | 5/2013 | Ashraff et al. |
| 8,548,955 | B1 | 10/2013 | Meinsen |
| 8,600,941 | B1 | 12/2013 | Raj et al. |
| 8,631,283 | B1 | 1/2014 | Sivasubramanian et al. |
| 8,738,958 | B2 | 5/2014 | Goroff et al. |
| 8,763,006 | B2 | 6/2014 | Bobak et al. |
| 8,977,866 | B2 | 3/2015 | Stoev et al. |
| 8,984,326 | B2 | 3/2015 | Phan |
| 2005/0049906 | A1 | 3/2005 | Leymann et al. |
| 2006/0059253 | A1* | 3/2006 | Goodman ............ G06Q 10/06 709/223 |
| 2006/0236151 | A1 | 10/2006 | Costlow et al. |
| 2006/0294507 | A1 | 12/2006 | Buskens et al. |
| 2007/0087756 | A1* | 4/2007 | Hoffberg ............ G06Q 10/0631 455/450 |
| 2007/0165525 | A1 | 7/2007 | Kageyama |
| 2009/0172536 | A1 | 7/2009 | Cheng et al. |
| 2009/0307166 | A1 | 12/2009 | Routray et al. |
| 2010/0153962 | A1 | 6/2010 | Tatu |
| 2011/0173405 | A1 | 7/2011 | Grabarnik |
| 2011/0307735 | A1 | 12/2011 | Greenberg |
| 2013/0111260 | A1 | 5/2013 | Reddy et al. |
| 2013/0339956 | A1 | 12/2013 | Murase et al. |
| 2013/0346617 | A1 | 12/2013 | Hotes et al. |
| 2014/0082131 | A1 | 3/2014 | Jagtap |
| 2014/0365822 | A1 | 12/2014 | Tarves, Jr. |
| 2015/0007171 | A1 | 1/2015 | Blake et al. |
| 2016/0132372 | A1 | 5/2016 | Anderson |

OTHER PUBLICATIONS

"Guide to Authorizing Operations Orchestration Flows," HP Operations Orchestration Software Studio, Software Version 7.50, Hewlett-Packard Development Company, L.P., 2008, Document Release Date: Mar. 2009, 187 pages.

HP Operations Orchestration Data Sheet, Hewlett-Packard Development Company, L.P., Rev. 9, May 2014, 8 pages.

International Search Report and Written Opinion dated Dec. 19, 2016 for International Application No. PCT/US2016/05670 filed on Oct. 13, 2016 by Sungard Availability Services, LP, 20 pages.

* cited by examiner

```xml
<rml>                                          701
<serverInfo state="1111:">
  <id>3f46a04c-96f7-11e4-9a3a-002264f38886</id>           700
  <hostname>wgisprd02</hostname>
  <platform>PowerEdge M600</platform>
  <OS> Linux</OS>
  <RAM>32185</RAM>
  <CPU/>
  <Provision>
    Action id="3f46ae16-96f7-11e4-9a3a-002264f38886">
      <type>ra_deploy_server</type>
      <name>linux</name>
      <param name="EVENT_ID">5015</param>
      <param name="SERVER_ASSET">Lo7 B02-B</param>
      <param name="RAID_LEVEL">5</param>
      <param name="HOSTNAME">wgisprd02</param>               718
      <param name="BACKUP_AGENT">netbackup-update-7.5.0.5-0.x86_64</param>
702   <param name="OS_NAME">RHEL5</param>
      <param name="OS_SP">10</param>
      <param name="OS_ARCH">x64</param>
    </Action>
    <Action id="de6b45c7-613a-4261-9884-5a29bc3164f7">
      <type>hpsa_agent_install</type>
      <name>linux</name>                                     720
      <param name="mac_address">D4-85-64-77-0F-2A</param>
    </Action>
  </Provision>
  <Configuration>
    <Action id="3f46c874-96f7-11e4-9a3a-oo2264f38886">
      <type>hpsa_script</type>                               722
      <name<DisableFirewall-Linux</name>
    </Action>                                                           729
704 <Action id="3f46cb3a-96f7-11e4-9a3a-002264f38886">
      <type>manual_step</type>
      <name>Wait For Migration To Customer Network</name>
      <param name="displayinginfo">Waiting For System wgisprd02 To Get Migrated To Customer
Network</param>
    </Action>
  </Configuration>
  <Restoration>
    <Action id="res11251-3919-4ce7-b116-b4ba2c766b30">
      <type>hpsa_swp</type>                                  730
      <name>SWP_Netbackup-7.5-0</name>
    </Action>
706 <Action id="3f46e142-96f7-11e4-9a3a-002264f38886">
      <type>hpsa_script</type>
      <name>nbu_restore_linux</name>
      <param name="startdate">"12/27/2014"</param>           732
      <param name="enddate">1/1/2015"</param>
      <param name="dirpath">"/gis"</param>
      <param name="mastersrvrname">"wbkupprd41.main.pssworldmedical.com"</param>
    </Action>
  </Restoration>     708
  <Cleanup/>
</ServerInfo>      710
  ...
```

FIG. 12A

```xml
<ServerInfo state="1111">                                          738
  <id>3f4950bc-96f7-11e4-9a3a-002264f38886</id>
  <hostname>wodbprd04</hostname>
  <platform>9117-MMB</platform>
  <OS>AIX</OS>
  <RAM>65536</RAM>
  <CPU/>
  <Provision>
    <Action id="3f495e5e-96f7-11e4-9a3a-002264f388886">
      <type>sos_aix_prov</type>
      <name>wodbprd04</name>
      <param name="COPPER_ID">DBJP561-P2-C5-T1</param>
      <param name="CLIENT_IP">60.2.1.8</param>
      <param name="SERVER_IP">60.1.1.2</param>
      <para name="GATEWAY">60.1.1.2</param>
      <paraM name="MANAGED_SYSTEM">P7-770-3_SN101EF7R</param>
      <param name="SYSCFG_NAME">wodbprd04</param>
      <param name="HMC_IP"10.64.43.36</param>
      <param name="HMC_USER">hmcuser</param>
      <param name="HMC_PASS">rs6k0401</param>
    </Action>
  </Provision>
  <Configuration>
    <Action id="3f498578-96f7-11e4-9a3a-002264f38886">
      <type>hpsa_script</type>
      <name>mKvg_aix</name>
      <param name="disksize">3353088</param>
      <para name="ppsize">1024</param>
      <para name="vgname">pss_all</param>
    </Action>
    <Action id="3f4990ae-96f7-11e4-9a3a-002264f38886">
      <type>hpsa_script</type>
      <name>mklv_aix</name>
      <param name="fstype">jfs2</param>
      <param name="lvname">redolv02</param>
      <param name="nopps">115</param>
      <param name="vgname">pss_all</param>
    </Action>
  </Configuration>
  <Restoration>
    ...
    ...
  </Restoration>
  <Cleanup/>
</ServerInfo>
```

FIG. 12B

```xml
<ServerInfo state="1111:">
  <id>3f4ff03e-96f7-11e4-9a3a-002264f38886</id>
  <hostname>wfldedi01</hostname>
  <platform>PowerEdge M610</platform>                           ← 746
  <OS>Windows 2003</OS>
  <RAM>4096</RAM>
  <CPU/>
  <Provision>
     <Action id="3f4ffdea-96f7-11e4-9a3a-002264f388886">
        <type>ra_deploy server</type>
        <name>windows</name>
        <param name="EVENT_ID">5015</param>
        <param name="SERVER_ASSET">Lo7 C01-K</param>
        <param name="RAID_LEVEL">5</param>
        <param name="HOSTNAME">wfldedi01</param>
        <param name="SYSTEM _DISK_SIZE">22593</param>
        <param name="BACKUP_AGENT">symantec_netbackup_7.5.0.5.x86</param>
        <param name="OS_NAME">W2K3</param>
        <param name="OS_SP">1</param>
        <param name="OS_EDITION">S</param>
        <param name="OS_KEY">XXXXX_XXXXX_XXXXX_XXXXX-XXXXX</param>
        <param name="OS_ARCH">x86</param>
     </Action>
     <Action id="3f501af0-96f7-11e4-9a3a-002264f38886">
        <type>hpsa_agent_install</type>                          ⎫
        <name>windows</name>                                     ⎬ 740
        <param name="mac_address">04-85-64-76-F5-44</param>      ⎭
     </Action>
  </Provision>
  <Configuration>
     <Action id="24b4561b-986d-4c6b-ae5e-82f33dac684">           ⎫
        <type>hpsa_script</type>                                 ⎬ 742
        <name>DisableFirewall-Win</name>                         ⎭
     </Action>
     <Action id="3f5031ca-96f7-11e4-9a3a-002264f38886">          ⎫
        <type>hpsa_script</type>                                 ⎪
        <name>ConfigureDisk-Win</name>                           ⎬ 744
        <param name="DriveLetter">D</param>                      ⎪
        <param name="PartitionNumber">2</param>                  ⎪
        <param name="PartitionSize">33798</param>                ⎭
     </Action>
  </Configuration>
  <Restoration>
     ...
  </Restoration>
  <Cleanup/>
</ServerInfo>
... .

</rml>
```

*FIG. 12C*

TOUCH FREE DISASTER RECOVERY

CROSS REFERENCE TO RELATED APPLICATIONS

This application claims priority to a U.S. Provisional Patent Application Ser. No. 62/241,189 filed on Oct. 14, 2015 entitled "Touch Free Disaster Recovery" and is a continuation-in-part of a prior co-pending U.S. patent application entitled "Recovery Execution System Using Programmatic Generation of Actionable Workflows" U.S. Ser. No. 14/682,262 filed on Apr. 9, 2015. The entire contents of each of the above-referenced patent applications are hereby incorporated by reference.

BACKGROUND

Information technology (IT) service providers are quite often challenged to find ways to effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources.

There is certainly a push to migrate to automated solutions for management of such a diverse environment. In some implementations point-to-point integration can be accomplished with Run Book Automation (RBA) solutions. But even coordination of automated solutions can become quite complex as that often involves integration of multiple products and services including provisioning engines, functional level products, and security concerns.

Disaster Recovery (DR) operations are for the most part a primarily manual operation. For highly virtualized environments and cloud-based applications, there are some available tools that leverage automation. But a large portion of enterprise IT is still not virtualized or placed in the cloud. For such environments, the only option is to manually codify recovery processes for each and every application and each and every data center scenario. That is typically a very labor intensive and time-consuming process.

Some process implementations leverage "task level" automation tools, freeing human operators to focus on coding the overall "orchestration". One such tool is Hewlett-Packard's (HP's) Operations Orchestration (HPOO), which permits automation of enterprise-scale IT processes and solutions. But even a solution based on HPOO still requires a human programmer to write a set of procedures that determine the appropriate tasks and the correct sequence in which to execute them.

SUMMARY

An example Recovery as a Service (RaaS) system includes a Resource Planning System (RPS), a Configuration Management Database (CMDB), a Recovery Execution System (RES), and an Asset Reservation System (ARS). In one implementation, a list of protected items can be retrieved and proposed to the customer for selection. This list can be a list of all assets that the customer has requested to be protected, but a more interesting case is presented when the customer can specify a scope for a Disaster Recovery (DR) test in terms of one or more applications. Being application-aware, the RPS frees the customer from having to remember which subset of servers, storage, networking equipment and other assets are needed to support the particular application(s) being tested. With this information in hand, the RPS can request, from the CMDB, identification of which protected resources fall within the scope of the requested DR test. The RPS can then send a request to the ARS asking to reserve particular assets (only those within the scope) At the time of DR test, the RES calls the RPS to retrieve the scope of the test along with list of physical assets reserved for the same. Then RES extracts the corresponding Recovery Configuration from the CMDB and programmatically generates a recovery workflow. Once RES creates that workflow automatically, it can then initiate orchestration of the test workflow, such as provisioning operating systems, configuring file systems, configuring networks, installing applications, restoring operating system and application data, performing cleanup, and executing startup processes. If there are such exceptions to automated workflow, then operations personnel may perform corresponding manual operations such as through a ticketing system.

More particularly, a Resource Planning System (RPS) and Asset Reservation System (ARS) coordinate with a Configuration Management Database (CMDB) to automatically generate and execute disaster recovery plans. The RPS accesses the ARS and CMDB to determine needed recovery assets within a scope defined for the recovery. The scope may be specified at a relatively high level of abstraction. For example, the scope may be specified as one or more particular application(s) to be recovered, rather than as a list of all of the hardware and software components that are used to implement the application(s).

A Recovery Execution System (RES) may be leveraged to automate the process of deploying assets and running a test of the plan at a scheduled time, and/or executing the plan during a disaster. A Recovery as a Service (RaaS) customer can now perform these functions in a self-service manner, even for information technology (IT) infrastructure elements that are hardware-specific and not virtualizable.

In a preferred implementation, once the scope of the recovery is identified, a reservation number may be associated with the recovery scope. The reservation number also serves to identify the needed assets with the recovery scope at a time of test or a time of disaster.

At the appointed time, the needed recovery assets are thus identifiable by the reservation number. The RES can then be activated to, as needed, programmatically generate a recovery workflow for the assets within scope. The recovery workflow can then be executed by an orchestration engine to complete the disaster recovery test, or to actually perform a disaster recovery, as the case may be.

In one implementation, the RES may be capable of programmatically generating a master workflow containing subflows with automated decisions to activate available automation components. The master workflow may be generated from data available in the CMDB; the CMDB may have been initially populated through automated discovery of a production data center's Configurable Items (CI's) with the scope, such as the particular application(s) for which recovery is desired. The CMDB data and resulting workflow file (which may be a Recovery Markup Language (RML) file and its corresponding object representation in JSON format) can then be sent to an orchestration engine to execute an actionable workflow, leveraging the underlying automation components. This approach also expedites the substitution of different automation components as they become available. The CMDB contains information about the configuration of each Configurable Item (CI) in the IT infrastructure. The CMDB may also maintain an Application Map that defines not only the in-scope servers, storage devices, and network devices in the production environment but also the relationship of each given application to each of these in-scope Configurable Items.

In this implementation, the RES includes several components including an RML model generator, one or more RML models, an orchestration engine, automation components, and access to a list of assets available in the recovery site. The RML model generator may for example be a Java program that reads the CMDB to obtain information about the configurable items related to the application scope. The RML model generator then automatically creates the XML-based schema with specialized tags and attributes to specify the high-level master flow. The orchestration engine then reads the RML file to execute the master flow, which in turn instantiates subflows to execute corresponding automation components.

BRIEF DESCRIPTION OF THE DRAWINGS

The description below refers to the accompanying drawings, of which:

FIGS. 12A, 12B and 12C include excerpts from an example Recovery Markup Language (RML) file.

DETAILED DESCRIPTION OF AN ILLUSTRATIVE EMBODIMENT

In particular implementations, Recovery as a Service (RaaS) is provided to a data center that is as seamless as possible from the Disaster Recovery (DR) service customer's viewpoint.

Figure 1:
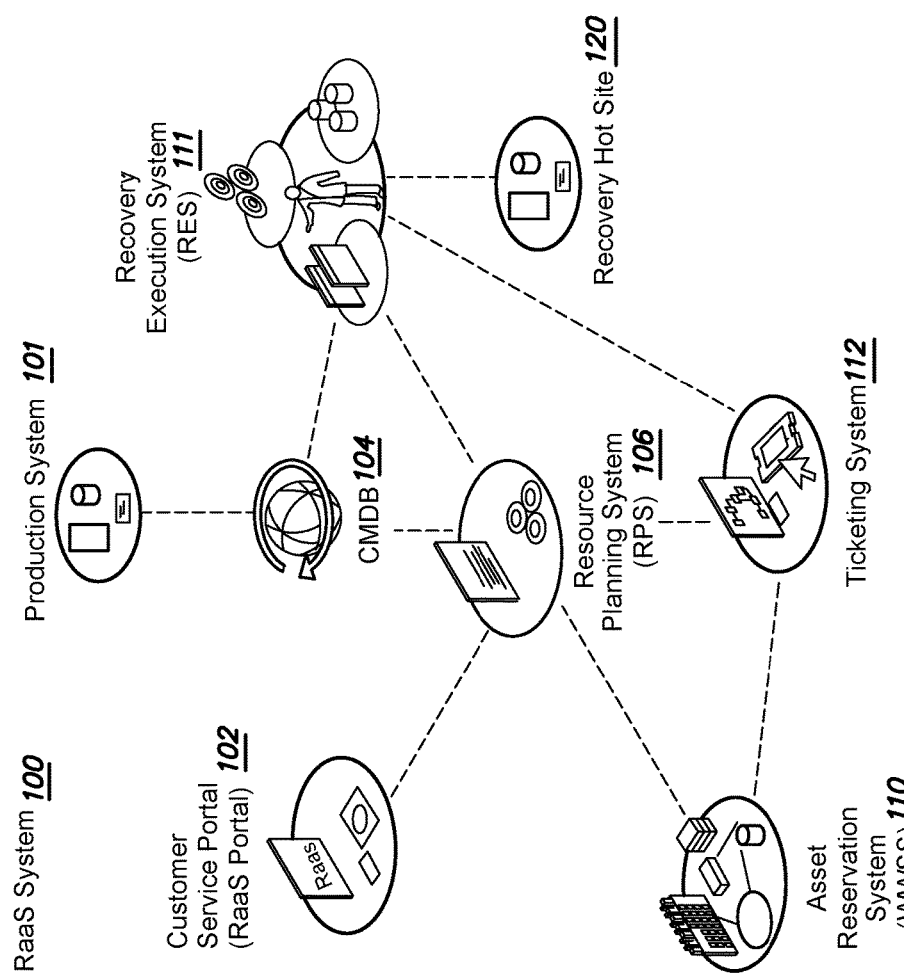
FIG. 1 is a high level diagram of components of an example system that provides "touch-free" disaster recovery.

Turning attention to FIG. 1, an example Recovery as a Service (RaaS) system 100 provides RaaS to a data processing system at a production site 101. The RaaS system 100 includes a number of sub-systems such as a Customer Service Portal 102 (also called the RaaS portal herein), a Configuration Management Database (CMDB) 104, a Resource Planning System 106, a Recovery Execution System 111, an Asset Reservation System 110, a Ticketing System 112, and a hot site 120. Each of the data processing systems 101, 102, 104, 106, 110, 111, 112, and 120 includes one or more data processors of some type, with one or more Central Processing Units (CPUs), storage for programs and data, user input and output devices, internetworking and security devices, and other features. The various systems are enabled to communicate with one another over various network connections.

The Customer Service Portal 102 serves as a user interface for a customer of the RaaS Service 100. The portal 102 is used by the customer to specify and to schedule DR tests, monitor the status of scheduled DR tests, declare disasters, and other functions.

The Resource Planning System 106 serves as a vehicle for the service provider to plan the use of available resources. The resources may include resources available for providing disaster services. Resources may typically include hardware infrastructure elements such as data processors, networking devices, and storage systems, but may also include human resources such as IT personnel. It should be understood that the resources include configurable items of various types. For example, the resources may permit the customer to provide hardware configuration settings. In other instances, the configurable items may permit the customer to install or configure operating systems or other software. It should also be understood that the various data processors may not all be virtualized platforms.

The Asset Reservation System (ARS) 110 may be any suitable resource scheduling system that manages requests to access particular resources at a particular time. Of consideration here is that it is common for ARS 110 to only manage resources via an asset tag number. As such, the RaaS system 100 must not only determine which type of resources match the client's needs but then also locate actual matching physical assets needed for a specific customer's DR test. The RPS 106 may request ARS 110 to reserve a particular asset for a particular date and time. However, the difficulty becomes in knowing which assets match the resources actually needed. This is a function of the Resource Planning System (RPS) 106. The RPS 106, if you will, consults a list of possibly needed resources from the CMDB 104 and programmatically tries to match those to what is available at the appointed test time as reported by ARS 110. But RPS 106 has to be told specifics. For example, the customer might need a resource specified as an "Apache v. 2.4.16 Web Server running on an Intel Core 2 Quad Q6600 processor with 8 gigabytes of cache memory." The RPS contains or has access to sufficient information to determine what matching assets are available to this level of detail. With the list of available assets at hand, the RPS can send a request to ARS 110. However, ARS 110 will not typically understand configuration specifics and may only manage assets by asset tag number. These asset tag details will typically not be customer facing. Thus, the Resource Planning System 106 serves to translate a customer facing resource description into an asset tag for a physical machine in an attempt to locate a matching asset. Given the asset tag, the RPS 106 can then ask ARS 110 to reserve that asset for the specified date and time.

Also shown is a Ticketing System 112 that can be utilized for handling certain types of events, exceptions, and other tasks that may need to be carried out manually.

The RES 111 may be capable of programmatically generating a master workflow containing subflows with automated decisions to activate the available automation components with a recovery scope. The master workflow may be generated from data available in the CMDB 104; the CMDB 104 may have been initially populated through automated discovery of a production data center's Configurable Items (CI's) with the scope, such as the particular application(s) for which recovery is desired. The CMDB 104 data and resulting workflow file can then be sent to an orchestration engine to execute an actionable workflow, leveraging the underlying automation components.

Figure 2:
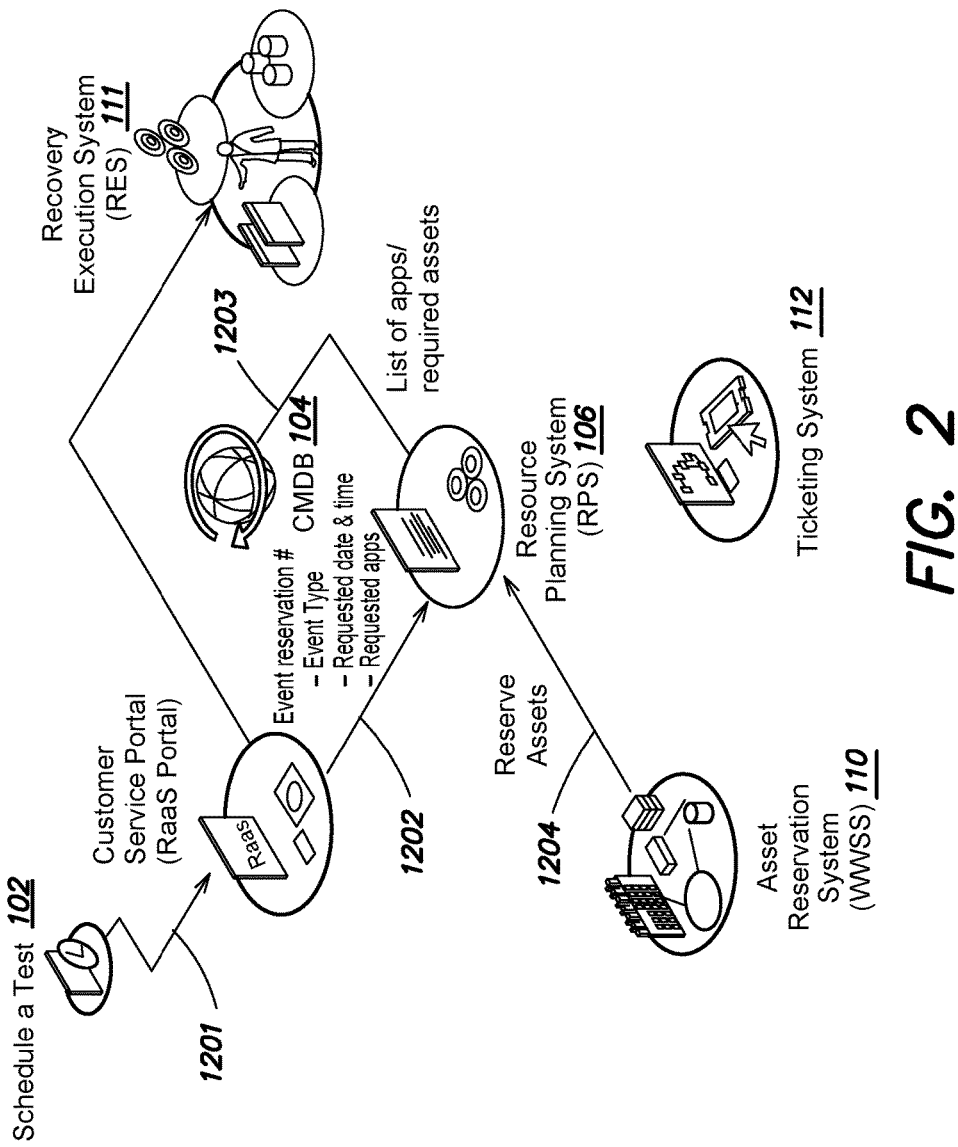
FIG. 2 shows an initial process for scheduling a test.

Turning attention to FIG. 2, a customer accesses the Customer Service Portal 102 to schedule a DR test in step 1201. The customer may request traditional disaster recovery services specified on a per asset basis, or may have arranged for a Managed Recovery Plan (MRP) that allows the customer to specify desired disaster recovery services at a high level of abstraction. Regardless, in step 1201 the customer requests that a DR test be scheduled for a particular scope and at some future time. The time for the test may be specified as a particular date and time of day, or as the earliest possible time, or a "best available" time when needed resources are most likely available, The RaaS Portal 106 then presents certain information such as a customer ID and information about the desired DR test to the RPS 106 in step 1202.

The RPS 106 in turn accesses the CMDB 104 a first time in step 1203 to obtain a list of protected assets. Whether these be assets identified by tag numbers, or by higher level constructs such as servers or applications, in the past it has been required for the customer to tell the RaaS system 100 exactly which assets are needed for the test. Thus, the customer has had to previously go to the effort of maintaining a list of protected hardware identified by asset tag numbers.

However, with the RaaS system 100, a specific list of protected items can instead be retrieved from RPS 106 and proposed to the customer for selection. This list can be a list of all assets that the customer has requested to be protected, but a more interesting case is presented when the system supports the ability for the customer to specify a scope for the test in terms of one or more applications, or in other ways.

Figure 3:
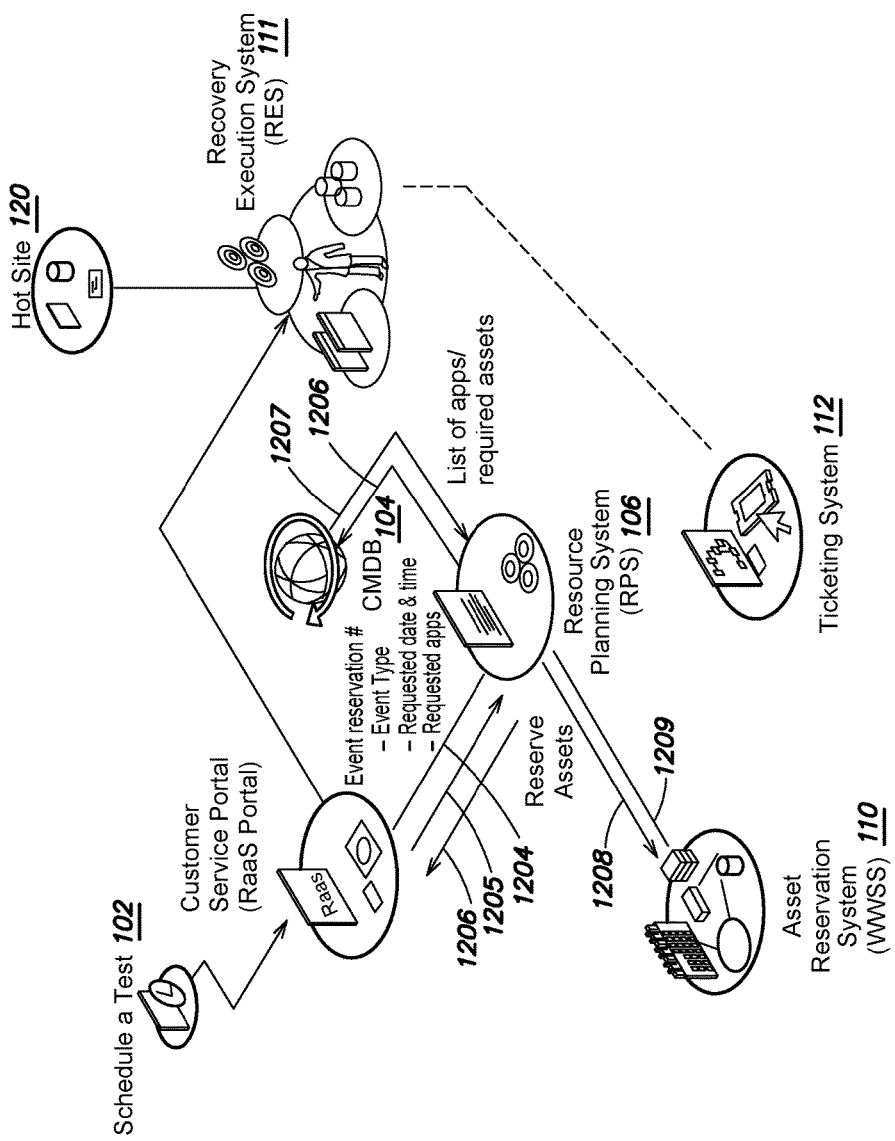
FIG. 3 shows additional steps in scheduling a test.

Turning attention to FIG. 3, a "scope-aware" RaaS system 100 can thus present a question to the customer in step 1204 such as "Here are the 50 applications we are protecting for you" and "Which ones do you want to test and when?" So the customer, for example, may simply state that it wishes to run a test within the scope of their "J.D. Edwards Enterprise One Accounts Receivable" application that runs on an Oracle database server. This frees the customer from having to remember which servers, storage, networking equipment and other assets are needed to support their accounts receivable application.

In still other scenarios, the customer may be asked to specify a scope for the test at a higher level of abstraction, such as in terms of their business unit operations or facilities locations. For example, the customer may want to specify a test of their "Finance Department" or a test of their "Alpharetta, Ga. facility". In these scenarios, the RaaS system 100 may prompt the user to run a test of some or all of the applications in use by the Finance Department or the Alpharetta facility (regardless of department or function).

However, other customers do not wish to interact with the RaaS system 100 at the operations/facilities or application level, but rather prefer specification at a lower level (perhaps for historical reasons) such as by specifying particular hosts. They might, for example, specify that they want to test their thirty-four (34) Windows servers and ten (10) Linux servers located in Albany, N.Y. and Modesto, Calif.

Thus the RaaS portal 102 may be programmed to present a choice to the customer to specify a test in terms of operations/locations, applications or infrastructure elements, depending on the customer's preference. If the customer prefers operations/locations, the RaaS portal 102 may prompt them that way. If the customer prefers applications, the RaaS portal 102 can present them a list of applications. If the preference is server-level, the RaaS 102 can display a list of servers and ask the customer to pick which servers to test. In any event, the customers check off a list of things to test, within a scope that they prefer, specifies a desired date and time for the test, and a type of test in step 1205.

With this information in hand, the RPS 106 can go back to the CMDB 104 a second time in step 1206 and make a call to request identification of which protected resources fall within the scope of the requested DR test. Thus, if the RPS 106 has a list of ten (10) different applications to test for a specific business unit, it can ask the CMDB for a complete "shopping list" of all assets needed to implement the selected ten (10) applications. In order to recover these 10 applications, for example, the call in step 1205 to the CMDB might return (in step 1207) to the Resource Planning System 106 a list that includes six servers identified by name, a Cisco® (Cisco is a trademark of Cisco Technology, Inc. of San Jose, Calif.) firewall, and a pair of 32 Terabyte (TB) Aberdeen® storage arrays (Aberdeen is a trademark of Aberdeen LLC of Santa Fe Springs, Calif.). The Resource Planning System 106 now performs its mapping—(this is typically happening in the background) of the logical resource need to the physical availability of assets at the desired time of test.

Once the RPS 106 determines the mapping, it can send a request to the ARS 110 in step 1208 and ask "Do you have these asset tag numbers available for this date and time?" The ARS 110 may then respond positively or negatively in step 206. If the assets are available at the requested time, then the ARS 110 can in step 209 return a reservation number. The reservation number confirms the assets have been reserved. The Resource Planning System 106 can then reply in step 210 to the customer via portal 102 with that reservation number.

Thus, the customer experiences a simple action and response—he requests system 100 to test certain application(s) on a specific date; and receives a reservation number in reply (or a rejection saying that the test is not available for the requested date, with perhaps some alternate dates that might work).

It should also be understood that this interaction between RaaS 102, RPS 106, CMDB 104 and ARS 110 can also be more inward facing with the service provider also having visibility into the reservation number and the assets being reserved.

The reservation number thus becomes a link to the "shopping list" of needed assets. Thus, at the time of test, the RPS 106 can go back to ARS 110, with the reservation number, and know that those assets are going to be available. The other thing that is linked to the reservation number is corresponding configuration information in CMDB 104. An asset tag alone only identifies which hardware is needed, such as, an Intel CPU, and doesn't have to identify to the system that it should, for example, install Windows Server 2012 Version 2 and a particular accounts receivable application as specified the CMDB 104. Without some information concerning the scope of the test, from the CMDB perspective, the customer might otherwise try to reserve all the assets it has protected, rather than only the assets needed.

So the reservation number is a link not only to the reserved needed assets by asset tag number, but also to the requested scope, such as an application, which in turn defines only the specific assets necessary for logical recovery within the scope of the specific test being run.

Figure 4:
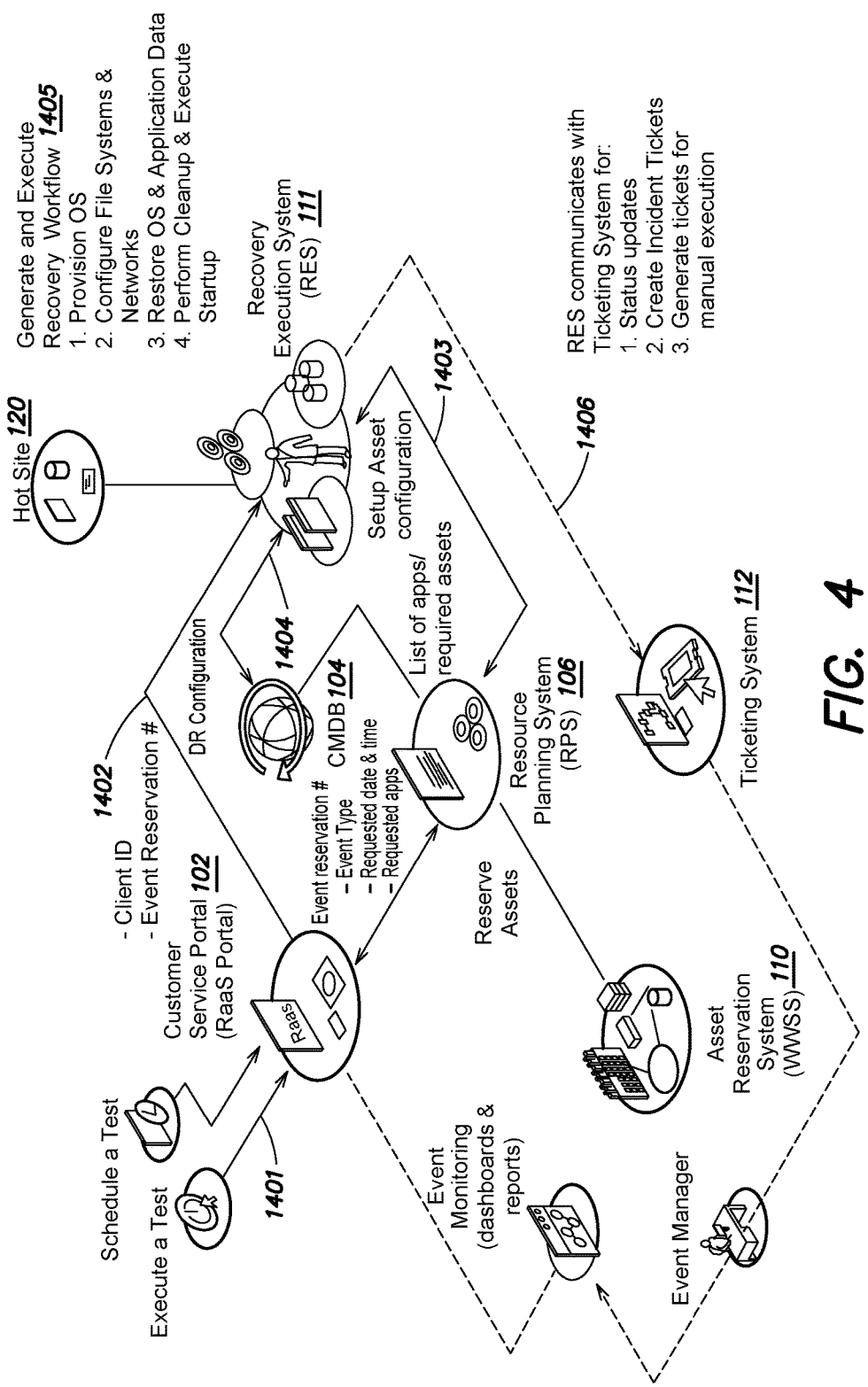
FIG. 4 shows a process for executing a touch-free disaster recovery test using a Recovery Execution System for automated workflow generation.

Turning attention to FIG. 4, on the day of the test, the customer returns to the RaaS portal 102 at step 1401. The customer could have remembered the scheduled time via a calendar or could have been prompted by an email or text message. The point is the customer comes back to portal 102 and indicates they want to now execute a previously reserved test and provides their reservation number.

The reservation number and client ID are passed to RES 111 in step 1402. RES 111 then looks in a list of reservations and makes a call to the Resource Planning System 106 in step 1403. In this step, the RES 111 asks the RPS 106 for a list of physical assets which have been reserved for this test. Next, the RPS 106 determines a list of the physical assets within the scope for this test as previously stored. The RES 111 then makes a call, in step 1404, to the CMDB 104 with the reservation number to obtain details of the logical configuration needed for this test. The CMDB 104 replies to RES 111 with the logical recovery configuration for this test.

The RES 111 may then, in step 1405, programmatically generates a recovery workflow as described in more below. Once RES 111 creates that workflow automatically, it can then initiate orchestration of the test workflow. For example, RES 111 orchestrates the execution of whatever tasks are in the workflow such as provisioning operating systems, configuring file systems, configuring networks, installing applications, restoring operating system and application data, performing cleanup, and executing startup processes. There may be some needed steps that are manual, such as patching network cables, or building an operating system configuration for which no "automation flow" is possible. In other instances, an automated workflow may throw exceptions, such as when a test fails, or if a backup restore fails because the backup is corrupted, or if a set of login credentials needed for certain servers are not correct. If there are such exceptions to normal workflow, then operations personnel may be asked to perform corresponding manual operations through Ticketing System 112.

However, the point remains that from a client perspective, the only interaction they see with the RaaS system 100 is working within the portal 102 to request the test be run.

Subsequent to step 1405, the RES 111 may communicate with Ticketing System 112 in step 1406 with status updates, event reports, or other mechanisms for managing tests. Tools such as "ServiceNow" may be used as the Ticketing System 112. The same system 112 may be used to generate test execution reports for the RaaS service provider.

In a further extension, test progress can be exposed to the customer for monitoring progress through the RaaS portal 102. From a customer experience standpoint, once they provide the system with a valid reservation number, the customer can switch to a different screen, such as a dashboard type screen, to monitor how the test is progressing. The ticket detail may or may not be exposed to the customer at this point. Progress of the test may be reported by Event Monitoring 144 at a level of granularity provided by the RES 108 to an Event Manager 140.

Figure 5:
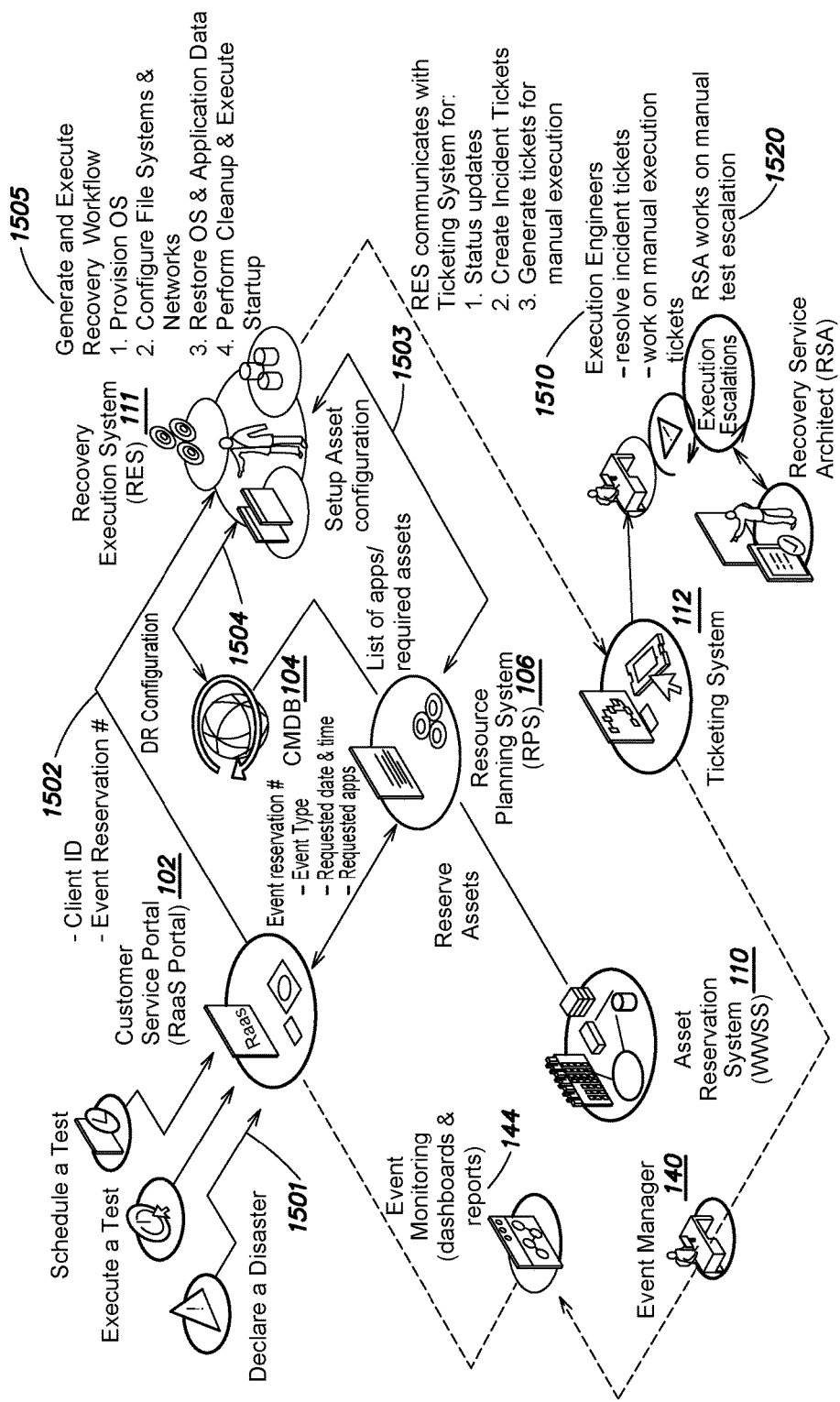
FIG. 5 shows a similar process when a disaster is declared.

When a disaster is declared as per FIG. 5, it is generally the same flow as for a DR test, with one difference being that the recovery assets are needed immediately as opposed to some future date. Thus, for example, in step 1501 the customer accesses the portal and indicates a disaster has occurred, supplying a scope for the disaster and client ID. In step 1502 (similar to step 1402) the reservation number and client ID are passed to the RES 111, which triggers the RPS 106 to determine the list of needed assets in step 1503. Next, in step 1504, the RES 111 makes a call to the CMDB; the CMDB replies (as in the case of FIG. 4) with the logical recovery configuration for recovery of assets within the disaster scope. The ARS then makes the resources available at hot site 120. Access to assets in a disaster recovery is likely given a higher priority by ARS 110 than assets needed to support other customers who are only requesting tests. Subsequent interaction in step 505 with the Ticketing System 112 make require actions by Execution Engineers 1510 to resolve incident tickets or with Recovery Service Architect (RSA) 1520.

The Recovery Execution System (RES) 111 is primarily concerned with programmatic generation of actionable Disaster Recovery (DR) workflows. That approach benefits the provider of the DR service, who is now freed from much of the manual work previously needed to generate recovery procedures that may need to be revised whenever a service customer changes configuration of one of their production environment assets.

Figure 6:
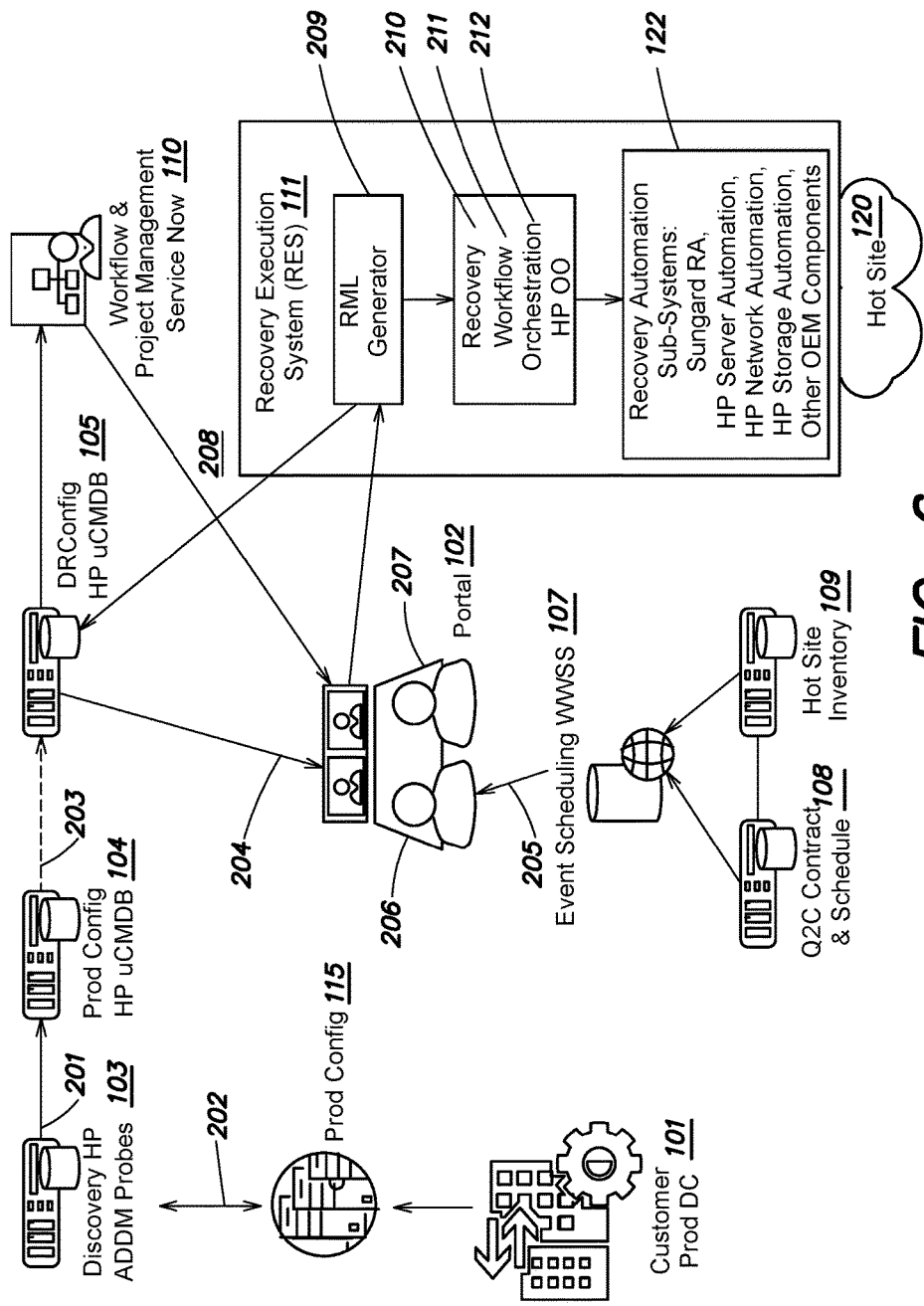
FIG. 6 is a high-level diagram illustrating how a Recovery Execution System (RES) may programmatically generate a master workflow for recovery of a data center at a recovery site.

FIG. 6 is a more detailed diagram of an example Recovery Execution System (RES) 111 that may be used to programmatically create and maintain a recovery procedure. In this end use of the RES 111, the goal is to recover one or more Configurable Items (CI's) existing in the production data center 101, in particular, to recover them to the recovery or "hot" site 120. The implementation may be used as a managed recovery program for Configurable Items (CI's) that include data processors, servers, storage subsystems, firewalls, security appliances, networking devices, and many other types of information technology (IT) infrastructure elements.

The illustrated elements include production configuration information 102, a discovery tool 103, a production environment Configuration Management DataBase (CMDB) 104, a Disaster Recovery CMDB 105, a portal 106, workflow and project management tools 110, a Recovery Execution System (RES) 111 including a Recovery Markup Language (RML) generator 209, recovery workflow orchestration 210, recovery is automation component subsystems 122, and a hot site 120. In addition, an event scheduling subsystem 107 accessible as a Worldwide Web Scheduling Service (WWSS) may include a scheduler 108 and a hot site inventory database 109.

A typical process to automate disaster recovery proceeds as follows. In a first step 201 administrative personnel or configuration engineers install application probes in the customer production data center 101. The probes are used by the discovery tool 103 to discover installed applications and the dependencies those applications have on particular Configurable Items (CI's) in the production data center 101. The discovery tool 103 may be Hewlett-Packard® (HP) Universal Discovery (UD), BMC® Atrium Discovery Dependency Mapping (ADDM) or other tools that can automatically discover physical and virtual IT assets, applications, and the dependencies between them. (Hewlett-Packard and HP are trademarks of Hewlett-Packard Development Company, L.P; BMC is a trademark of BMC Software, Inc. of Houston, Tex.).

Configuration data for these Configurable Items (CI's) may be discovered by these probes (or in other ways) and stored in the Production CMDB 104. The Production CMDB may, for example, be an HP Universal CMDB (uCMDB).

In a next step 203, the discovered configuration information is also copied over a secure unidirectional connection (such as an HTTPX connection), and cloned to a Disaster Recovery (DR) CMDB 105.

The cloned DR CMDB 105 may then be used to create, maintain and specify a recovery configuration without impacting the dependency of the operating production environment on the Production CMDB 104. Subsequent exchanges between the two configuration databases 104 and 105 can keep the configuration information in DR CMDB 105 up to date.

In a next step 204, when a customer wishes to schedule a test or declare a disaster, they access the portal 106. Based on a presented customer identification (ID) credential, such as a login ID, a specific recovery configuration is retrieved from the DR configuration database 105. The customer can then enter additional details, such as the scope of the test or disaster recovery. The scope may specify, for example, one or more applications to be recovered and a time at which to perform the recovery.

In a next step 205, using the provided scope and a requested time (which may be a future date in the case of the test or immediate execution in the case of disaster recovery) a scheduling service 107 is contacted. The scheduling service 107 uses the recovery configuration to assess availability of matching resources in the hot site inventory 109.

In a next step 206, based on resource availability, the scheduling service 107 reserves the needed resources for use at the scheduled time and provides a confirmation report to the customer via portal 106.

In step 207, the recovery event occurs at the scheduled time and the Recovery Execution System 111 is launched in step 208.

Next in step 209, the RES 111 extracts the recovery configuration information from the CMDB 105 for the specific scope. The RML generator step 209 then automatically creates an XML document using a proprietary schema referred to in herein as the Recovery Markup Language (RML) file. The RML file contains a specification for a master workflow that contains a set of logical steps to recover the in-scope application(s), including its corresponding data object representation using JSON (JavaScript Object Notation) or some other suitable format. The RML generator 209 is discussed in greater detail below.

In a next step 211, the recovery workflow orchestration engine 210 then translates the logical workflow as specified in the RML file into a set of physical set of workflow-enabled tasks. These workflows may specify using particular automation subsystems as "subflows" that automate tasks to be performed on the servers, network devices, storage devices and other configurable items on the hot site 120.

In step 211, the RES 111 then communicates with event scheduling system 107 to acquire access to the assets that were reserved for the event.

In state 212, the RES 111 then invokes the various automation subsystems 122 to perform the workflow tasks on the reserved components. As seen, typical automation subsystems 122 may include Sungard Availability Services' ® Recovery Automation, HP Server Automation, HP Network Automation, HP Storage Automation, and other OEM automation components depending upon the configurable items with the scope of the recovery event. (Sungard Availability Services is a trademark of SunGard Development Corporation of Wilmington, Del.).

Figure 7:
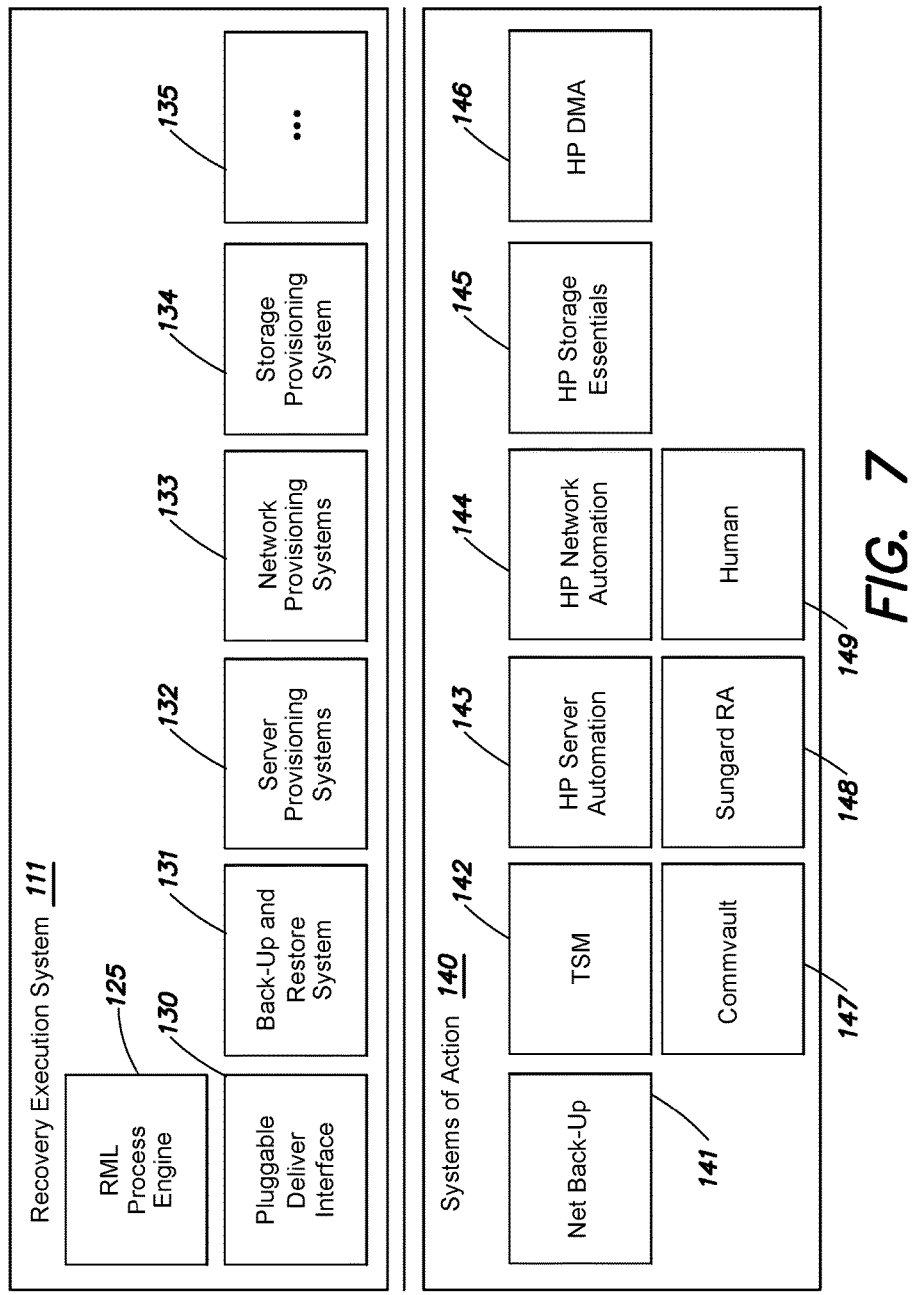
FIG. 7 is a high-level view of the RES and automation components.

FIG. 7 is a more detailed view of components of the RES 111. An RML process engine 125 reads the object representation of the RML file and engages various subsystems to implement actions. A pluggable driver interface is provided to the various subsystem functions including backup and restore subsystem 131, server provisioning systems 132, network provisioning systems 133, and storage provisioning systems 134. In general, other types of subsystems 135 useful in provisioning or arranging configurable items may also be accessible to the RML process engine 125.

The RML process engine 125 may for example be implemented as a Java or Jython program that can read the RML file and the contents of the DR CMDB 105 to obtain information about the configurable items related to the scope. Corresponding systems of action 140 are then invoked as indicated by workflows in the RML file. Input is also provided to the RML process engine 125 from the scheduler 107 to indicate which assets are currently at its disposal to instantiate a particular work flow at hot site 120.

The RML process engine 125 may also invoke recovery automation functions to implement actions. In one example environment, these automation functions may include a Net backup 141, Tivoli storage manager (TSM) 142, HP Server Automation 143, HP Network Automation 144, HP Storage Essentials 145, HP DataBase Middleware Automation (DMA) 146, Commvault 147, Specialized Recovery Automation (RA) services such as Sungard Availability Services RA 145 and/or manual tasks to be performed by humans 149.

Figure 8:
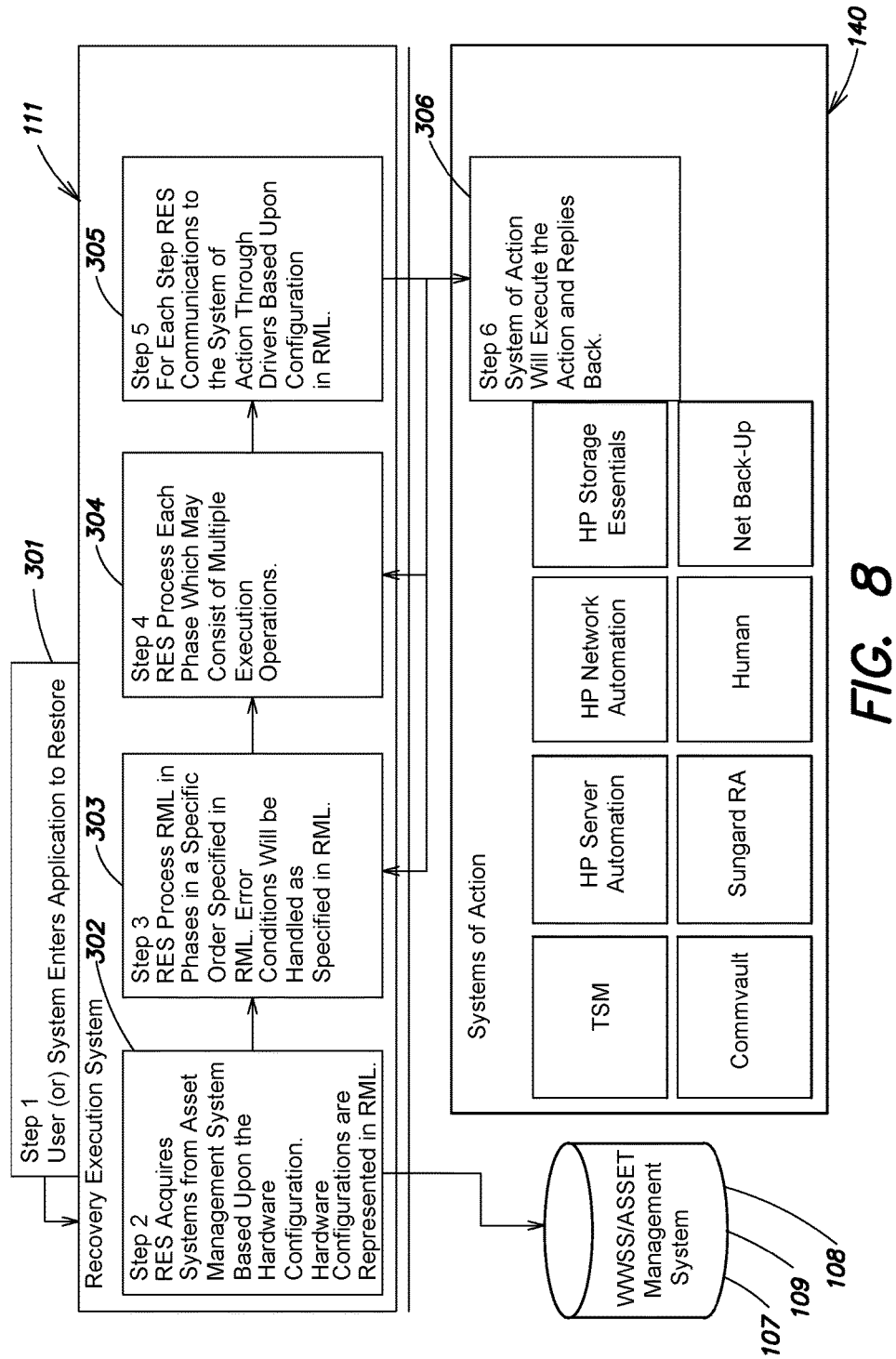
FIG. 8 is a more detailed view showing example steps performed by the RES using an operation orchestration tool.

FIG. 8 depicts an example sequence of steps performed by the RES 111 to implement recovery of data center 101 at hot site 120.

In a first step 301, a user indicates application(s) to be restored via portal 106. In a next step 302, the RES 111 acquires asset information the DR CMDB 105, scheduler 107 and inventory database 109 concerning the needed target hardware configuration.

In a next step 303, the RES 111 processes the RML file in an order as specified in the RML file itself. Any error conditions may be handled the specified in the RML file.

More particularly, in a next step 304, the RES 111 can then process the master workflow in many different phases, as was determined from the application dependencies.

Finally, in step 305 for each phase in the RML file, the RES communicates with the corresponding system of action to execute one or more subflows. For example, a given system of action 140 (or subflow) can execute action(s). When the subflow is complete, it can reply back to the RES 111 to execute the next phase in the master workflow.

Figure 9:
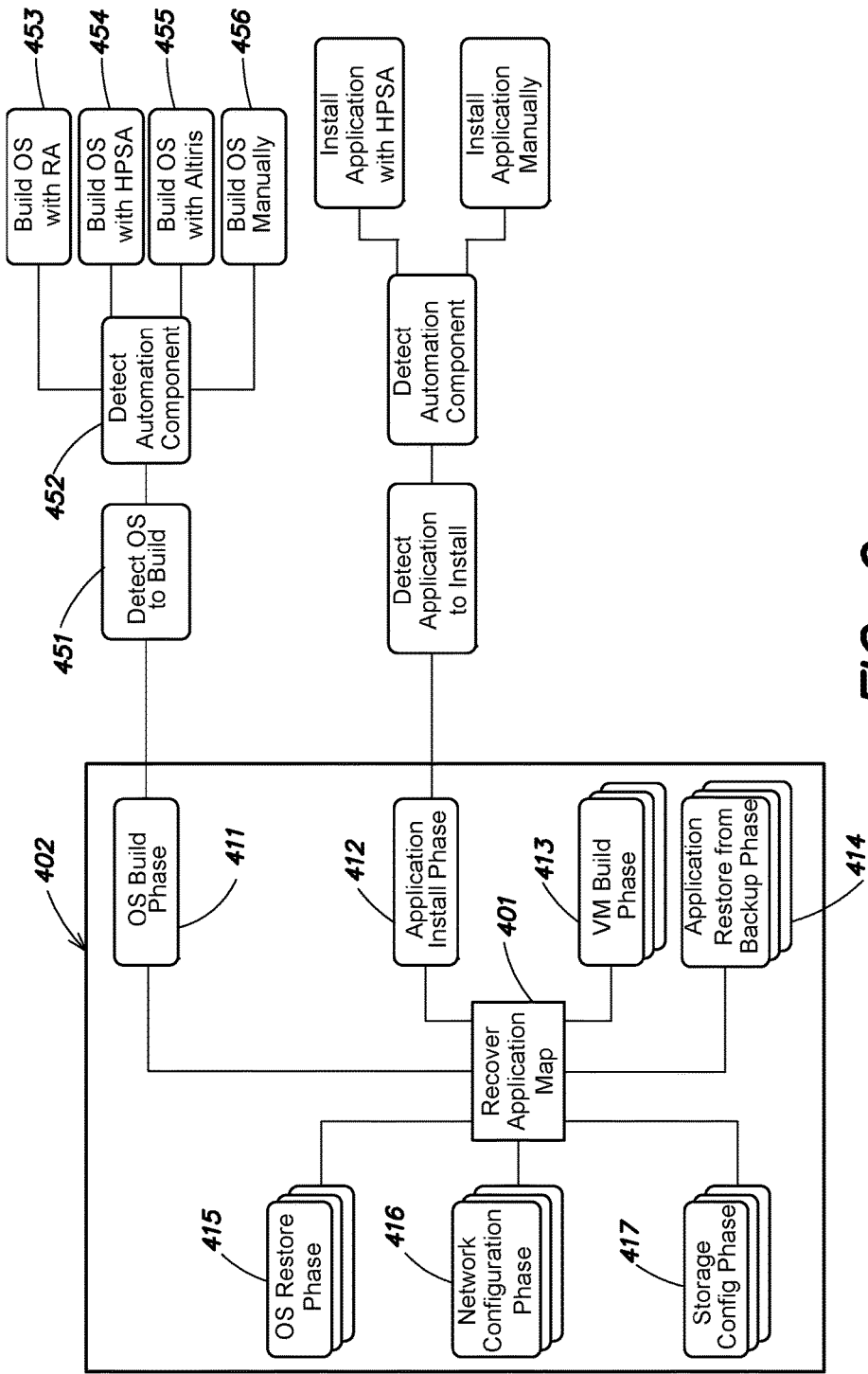
FIG. 9 is an example simple master workflow processed by the RES and actionable workflow.

Turning attention now to FIG. 9, a simple example of a master workflow and actionable subflows will be described in more detail. A Recover Applications Map 401 is retrieved together with the elements of a RML file that indicate a master workflow 402. In this example shown here, the master workflow 402 includes two phases—an Operating System (OS) build phase 411 and an application install phase 412.

The Application Map 401, described in more detail below, includes data representing all configurable items that are connected to the application(s) within the recovery scope. This may include a list of servers, storage devices and network devices, and their associated configuration information.

OS build phase 411 invokes a sequence of steps including "detecting which operating system to build 451" and "detecting available automation components 452."

Step 451 can detect which operating system needs to be built, for example, by reading the CMDB 105 and/or Application Map information. Automation component detection 452 then uses the OS information to determine the available automation components that can be used to build that operating system. The RES 111 thus specifies that an operating system needs to be built, but when it comes to the "hows" of actually building the OS, the available automation components are leveraged. In the present example, available subtasks for building an operating system include Recovery Automation (RA) 453, HP Server Automation (SA) 454, Altris 455, and a manual build 456.

In one example, assume that the CMDB indicates that the OS to build is an implementation of Red Hat Linux. Assume also that this is the first time that the RES 111 has been asked to build this particular instance of Red Hat Linux. Here the automated OS build options 453, 454, 455 are not available, and the OS must be built manually 456. However, at some later time an administrative user may determine how to build the particular Red Hat Linux instantiation using HP SA. An automated HP SA Red Hat install subflow can then be linked to the detect automation component 452 via input at portal 106. On subsequent iterations, without altering the high-level master workflow 402, this new automation component 454 for building Red Hat Linux is then available to be automatically invoked by the corresponding detect automation component.

Thus when a new automation component becomes available, another subflow can be added to the available options in the detect automation component 452, and related aspect(s) of the master workflow need not be modified.

It is also possible that the subflows are specific to each type of automation component and also to each service provider or customer. For example, building Red Hat Linux for one customer's data center may involve a different automation component than for another customer.

Note that the master flow 402 can remain the same regardless of how the OS build phase 411 and application install phase 412 are actually implemented. Thus, in a more general sense, a recovery workflow tends to provision infrastructure, configure infrastructure, restore data to the configured infrastructure, and then start the application(s). Also, in a general sense, the subflows called by the master flow indicate how to carry out particular tasks running on individual task automation systems.

It is also now understood that one essential aspect herein is eliminating hand coding of Operations Orchestration (OO) by detecting what to do (build an OS, or install an application) and automation components 452 which in turn enable programmatic execution of available automation tasks.

Figure 10:
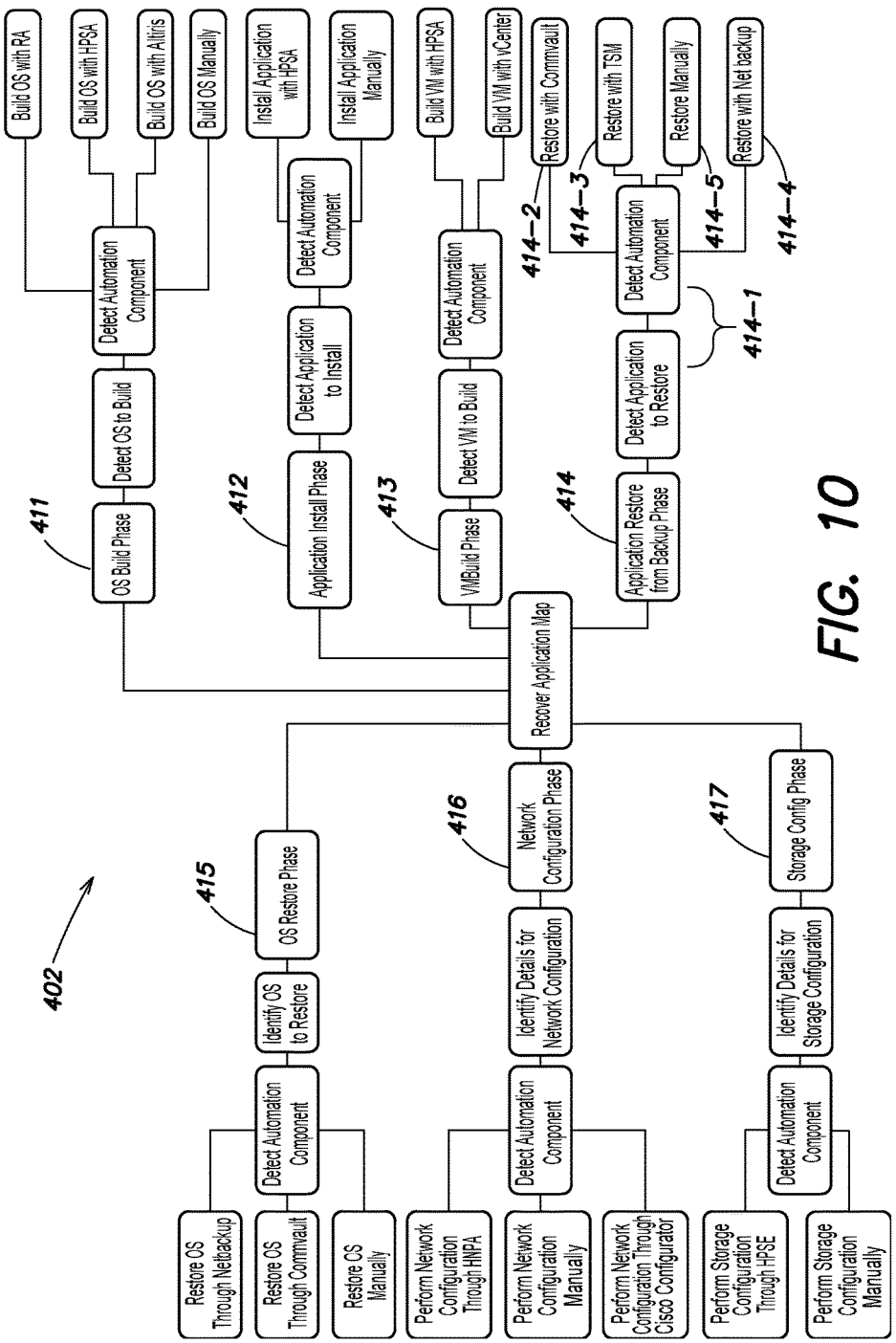
FIG. 10 is a more complex master workflow.

FIG. 10 is a more complicated example of a master workflow for restoring an entire data center. In this example, the master workflow 402 includes an OS build phase 411 and application install phase 412 but also includes a number of other phases such as a virtual machine build phase 413, application restore from backup phase 414, operating system restore phase 415, network configuration phase 416 and storage configuration phase 417. Each phase type in the master flow has a detection piece and an automation component piece, and the automation components links to the available subflows to carry out automated tasks. In one example, for "application data restore from backup 414," the detect automation components 414-1 may provide links to automation components including Commvault 414-2, TSM 414-3, NetBackup 414-4 or manual restore 414-5. A network configuration phase 416 may have links to subflows that include performing network configuration through HPNA and Cisco configurator or manual configuration. Similar sets of subflows for storage configuration 417, OS restore 415, and VM build 413 options are also illustrated.

The RES 111 may report current progress of the master workflow back to the RaaS portal 102 for presentation to the user. In one example, execution through each of the detect, build, install, configuration and/or other restore phases as illustrated in the example workflow of FIG. 10 might be reported via the RaaS portal 102 on a per application, or per-Configurable Item basis, as preferred by the RaaS customer.

Figure 11:
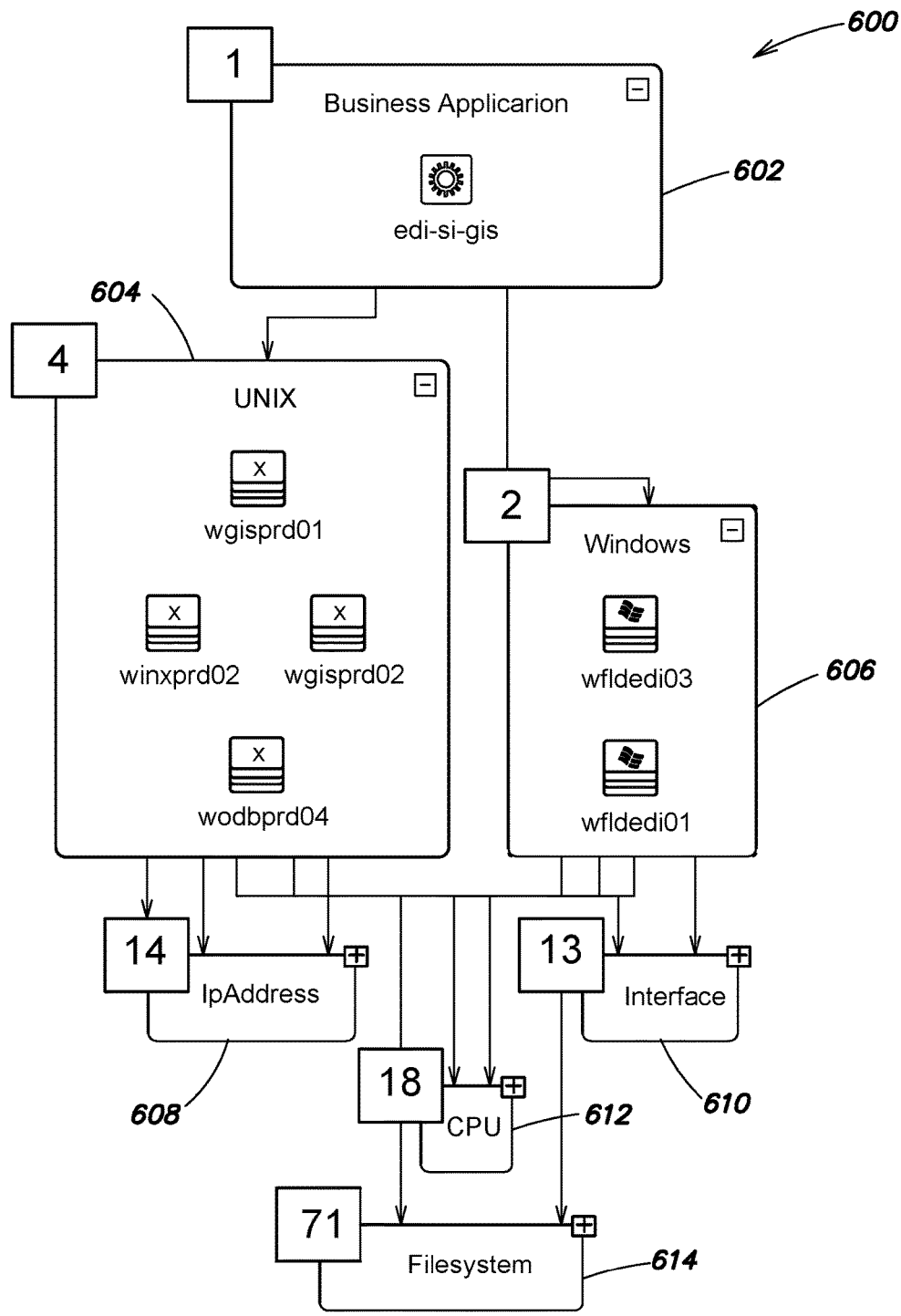
FIG. 11 is an example Application Map.

FIG. 11 is a rendition of an example application map 600 that maintains the relationship for one single application to a number of in-scope Configurable Items (CI's) as previously mentioned. In the particular instance shown, the application 602 is an Electronic Data Interchange (EDI) application named "edi-si-gis". Six servers are within the recovery scope here, including four UNIX servers 604 (the hosts named wgisprd01, wgisprd02, winxprd02, and wodbprd04) and two Windows servers 606 (the hosts named wfldedi 03 and wfdedi01). The digit displayed next to each item type in the hierarchy indicates how many configurable items (CI's) are associated with that particular configurable item type. Graphical User Interface options convenient for displaying the application map 600 (such as + and − click boxes to expand or collapse the application map hierarchy), may be provided.

Also shown as part of the application map 600 are additional resources used by the application 602 including Internet Protocol addresses 608 (of which there are fourteen (14) in use, interfaces 610 (of which there are thirteen (13) in use, and which may for example be interfaces to other systems and databases), CPU cores 612 (of which there are eighteen (18) in use) and filesystems 614. In FIG. 11, the view of these resources is collapsed and thus the details are not visible; the details can be accessed via the expand click box (+) displayed next to each configurable item type.

Each of the items in the example application map 600 hierarchy of FIG. 6 are connected to the single EDI application 602. It should be understood that, more generally, a particular recovery scope may include multiple applications, each having their own application map 600.

FIGS. 12A, 12B, and 12C are excerpts from an example RML file 700 generated for the EDI application shown in FIG. 11. It is but one possible example of a generated XML-based schema with specialized tags and attributes to specify a high-level master flow with subflows as previously described above.

A first excerpt of the RML file 700 shown in FIG. 12A contains server definition info that pertains to one of the Linux hosts (wgisprd02). This is identified by a first tag 701 and the following tags that specify that host's platform type, operating system type, and needed random access memory (RAM). Several classes of subflows are associated with each configurable item, including Provision 702, Configuration 704, Restoration 706, and Cleanup 708. The end of the server info definition for Linux host (wgisprd02) is indicated by another tag 701. It should be understood that FIG. 12A is meant to be a non-limiting example and that there may be action types in each class of automation actions other than those illustrated.

Within each class are included one or more callable automation components (each identified by an <Action ID> tag) and one or more parameters (identified by <param name> tags). Within the <Provision> class for this host, a first Action ID 718 is an automation component for deploying a server, with parameters including EVENT_ID, SERVER_ASSET, RAID_LEVEL, HOSTNAME, BACKUP AGENT, OS_NAME, OS_SP, and OS_ARCH. A second Action ID 720 enables an automation component that uses HP SA for installing a Linux distribution at a particular MAC address.

Within the Configuration class of subflow, a third Action ID 722 is for enabling an automation component that disables a Linux firewall. Yet another available action is Action ID 724 that is a manual component that waits for user input until migration to a customer network to complete.

The example Restoration class may include an Action ID 730 that invokes an HP SA script to perform a Netbackup action and Action ID 732 that runs another HP SA script to restore Linux.

An example Cleanup class is not shown in detail but would include other Action IDs that might be necessary for orderly conclusion of subflows.

It should be understood that the RML associated with each configurable item type may have different Action ID types. FIG. 12B is an example RML excerpt 738 for Provisioning, Configuration, and Restoration of AIX for the host named "wodbprd04" in the application map of FIG. 11. As such, the automation components associated with each action type will be tailored for an AIX installation and thus differ from those shown for the Linux installation in FIG. 12A.

FIG. 12C is an RML excerpt 740 for the host names "wfldedi01" that is running Windows 2003. The associated Action IDs are thus appropriate for this environment, including HP SA automation components which install Windows 740, disable a Windows firewall 742, and configure and partition a Windows disk 744.

The foregoing description of example embodiments provides illustration and description of systems and methods for implementing Recovery as a Service, but is not intended to be exhaustive or to limited to the precise form disclosed.

For example, it should be understood that the embodiments described above may be implemented in many different ways. In some instances, the various "data processing systems" described herein may each be implemented by a separate or shared physical or virtual general purpose computer having a central processor, memory, disk or other mass storage, communication interface(s), input/output (I/O) device(s), and other peripherals. The general purpose computer is transformed into the processors with improved functionality, and executes the processes described above to provide improved operations. The processors may operate, for example, by loading software instructions, and then executing the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. It further should be understood that certain implementations may dictate the block and network diagrams and the number of block and network diagrams illustrating the execution of the embodiments be implemented in a particular way.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

No element, act, or instruction used herein should be construed as critical or essential to the disclosure unless explicitly described as such. Also, as used herein, the article "a" is intended to include one or more items. Where only one item is intended, the term "one" or similar language is used.

Further, the phrase "based on" is intended to mean "based, at least in part, on" unless explicitly stated otherwise.

Headings and/or subheadings herein are used to segment this patent application into portions to facilitate the readability of the application. These headings and/or subheadings are not intended to define or limit the scope of what is disclosed and/or claimed in this patent application.

Also, the term "user", as used herein, is intended to be broadly interpreted to include, for example, a computer or data processing system or a human user of a computer or data processing system, unless otherwise stated.

The foregoing description has been directed to specific embodiments of the present disclosure. It will thus be apparent, however, that other variations and modifications may be made to the described embodiments, with the attainment of some or all of their advantages. Therefore, it is the object of the appended claims to cover all such variations and modifications as come within the true spirit and scope of the disclosure and their equivalents.

What is claimed is:

1. An automated method for providing Recovery as a Service (RaaS) to a protected site comprising:
    prior to a time for executing a Disaster Recovery (DR) test,
        at a Resource Planning System (RPS) executing on one or more data processors,
        accepting an input specifying a DR test to be executed within the protected site, including at least a scope for the DR test and a designated time for the DR test;
        requesting, from a Configuration Management DataBase (CMDB) executing on one or more data processors, identification of one or more protected resources within the scope of the DR test;
        requesting, from an Asset Reservation System (ARS) executing on one or more data processors, a reservation for the one or more protected resources within the scope of the DR test at the designated time;
        associating a reservation identifier with the reservation for the one or more protected resources within the scope of the DR test; and
        presenting the reservation identifier to a user;
    at the designated time for the DR test,
        using the reservation identifier, determining a list of protected resources associated with the reservation identifier;
        requesting a logical recovery configuration for resources available in a recovery site executing on one or more data processors;
        programmatically generating a recovery workflow from the logical recovery configuration; and
        executing, by one or more data processors, the recovery workflow to provide the recovery site.

2. The method of claim 1 wherein the scope for the DR test is specified as an application, without identifying specific assets needed to recover the application.

3. The method of claim 1 wherein the scope of the DR test identifies specific assets including servers, storage, and/or network hardware.

4. The method of claim 1 wherein the scope of the DR test identifies a business unit or location.

5. The method of claim 1 wherein the step of programmatically generating a recovery workflow further comprises the steps of:
    obtaining configuration data for the protected resources within the scope of the DR test, and further executing on one or more data processors, for each protected resource:
        a recovery task;
        a configuration detection process;
        an automation component detection process; and
        wherein the automation component process executes at least one automation component including at least one subflow for executing the recovery task.

6. The method of claim 1 additionally comprising:
    maintaining configuration data for the protected resources in the Configuration Management DataBase (CMDB);
    periodically cloning the CMDB to a Disaster Recovery Configuration Management DataBase (DR-CMDB); and
    wherein the step of requesting identification of one or more protected resources comprises querying the DR-CMDB to locate configuration data for the one or more protected resources within the scope of the DR test.

7. The method of claim 1 wherein the Asset Reservation System (ARS) further uses the reservation identifier for identifying a reservation for using the protected assets at the designated time.

8. The method of claim 1 wherein the step of programmatically generating a recovery workflow is performed by a Recovery Execution System (RES) executing on one or more data processors using the logical recovery configuration information.

9. The method of claim 8 wherein execution progress of the recovery workflow is reported by the RES and presented as an output to a user.

10. The method of claim 8 wherein the recovery workflow includes at least an operating system build phase and an application install phase.

11. The method of claim 8 wherein the recovery workflow further includes one or more of:
    a virtual machine build phase,
    an application restore from backup phase,
    a storage configuration phase, a network configuration phase, or
    an operating system restore phase.

12. The method of claim 1 additionally comprising:
    a ticketing system, executing on one or more data processors, for handling exceptions to the recovery workflow.

13. The method of claim 1 further comprising:
    storing a representation of the recovery workflow as a sequence of operations specified in a markup language file; and
    executing the recovery workflow, by submitting the markup language file to an operations orchestration engine, the operations orchestration engine executing on one or more data processors.

14. The method of claim 1 additionally comprising:
    at a time of disaster,
        at the Resource Planning System (RPS) executing on one or more data processors,
        receiving input identifying a disaster scope;
        requesting, from the Configuration Management DataBase (CMDB) executing on one or more data processors, a list of protected resources associated with the disaster scope;
        requesting a logical recovery configuration for resources available in a recovery site within the disaster scope;
        programmatically generating, on one or more data processors, a disaster workflow from the logical recovery configuration; and
        executing the disaster workflow on one or more data processors to provide the recovery site.

15. In a Recovery as a Service (RaaS) system executing on one or more data processors, the RaaS comprising a Configuration Management Database (CMDB), a Resource Planning System (RPS), a Recovery Execution System (RES), and an Asset Reservation System (ARS), a method comprising:
- at the RPS executing on one or more data processors, the steps of:
  - receiving information about a future desired Disaster Recovery (DR) test at the RPS;
  - retrieving a list of protected items and presenting the protected items for selection, wherein the selection is specified as a scope for the DR test as one or more applications;
  - requesting, from the CMDB executing on one or more data processors, identification of which protected resources are within the scope of the DR test;
  - sending a request to the ARS executing on one or more data processors, the request asking to reserve physical assets that correspond to the protected resources that are within the scope of the DR test;
  - receiving a reservation identifier from the ARS and presenting it to a user;
- at a time for the DR test,
  - at the RPS executing on one or more data processors;
  - receiving the reservation identifier from a user;
  - requesting, from the ARS, a list of the physical assets for the DR test as previously associated with the reservation identifier;
  - requesting, from the CMDB executing on one or more data processors, a logical recovery configuration for the DR test using the physical assets for the DR test;
  - requesting the RES, executing on one or more data processors, to programmatically generate a recovery workflow using the logical recovery configuration; and
- requesting the RES, executing on one or more data processors, to initiate orchestration of the recovery workflow.

* * * * *